(No Model.)

W. E. HARMON & J. L. GARWOOD.
DRAFT ATTACHMENT FOR DOUBLETREES.

No. 534,646. Patented Feb. 26, 1895.

Witnesses
John Tomine
Horace G. Seitz

Inventors
Wm. E. Harmon
John L. Garwood
by
J. F. Beale
Attorney

THE NORRIS PETERS CO., PHOTO-LITHO., WASHINGTON, D. C.

UNITED STATES PATENT OFFICE.

WILLIAM ELLIS HARMON AND JOHN L. GARWOOD, OF HOUSTON, TEXAS.

DRAFT ATTACHMENT FOR DOUBLETREES.

SPECIFICATION forming part of Letters Patent No. 534,646, dated February 26, 1895.

Application filed July 11, 1894. Serial No. 517,242. (No model.)

*To all whom it may concern:*

Be it known that we, WILLIAM ELLIS HARMON and JOHN L. GARWOOD, citizens of the United States, residing at Houston, in the county of Harris and State of Texas, have invented certain new and useful Improvements in Draft Attachments; and we do hereby declare the following to be a full, clear, and exact description of the invention, such as will enable others skilled in the art to which it appertains to make and use the same.

Our invention relates to draft attachments.

The object of our invention is to provide an improved draft attachment for doubletrees which shall obviate its tendency to throw the draft of the animals directly against each other and cause the stronger or in starting the quicker animal to pull the other back.

It is also our object to provide a draft attachment which shall prevent the swaying of the pole or tongue sidewise, and cause the draft of the animals to be independent of each other.

It is also our object to provide a flexible or yielding connection between the draft animals and the axle-clips or other fixed point of draft attachment whereby we obviate the jar upon the horse and vehicle and keep the traces taut, or take up the slack therein when the animals are not pulling.

Figure 1:
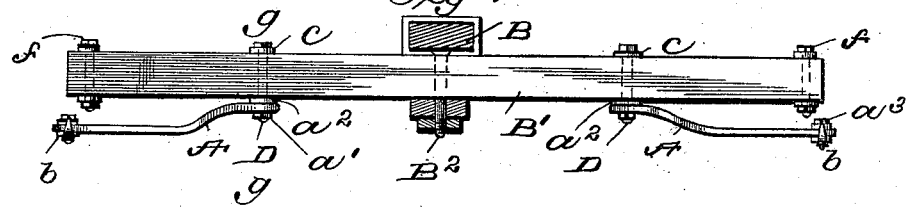
Figure 2:
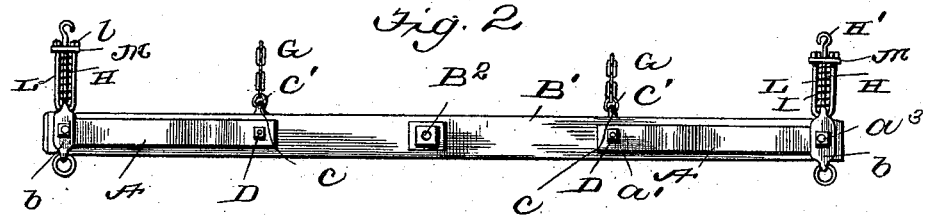

In the accompanying drawings, forming a a part of this specification, Figure 1 is a front elevation, and Fig. 2 a bottom plan view showing our flexible or yielding spring connection with attachments; and Figs. 3, 4, 5, 6, 7, and 8 are detail views.

Referring more particularly to the drawings B denotes the tongue and B' denotes the ordinary doubletree pivoted on the doubletree bolt $B^2$ the doubletree being stayed back parallel to the front axle on each side of the bolt by suitable connections, either stay chains or pole bows, or other means but we prefer stay chains as shown in Fig. 2.

A A denote swinging arms their free or outer ends, when in normal position, running parallel and coextensive with the doubletree, their inner ends having an upward bend and pivoted to the under side of the doubletree on each side of its pivotal point. By means of said bend the arms are deflected below and swing free of possible contact with the doubletree. D D are threaded and nutted bolts for pivoting said arms to the doubletree and $a^2$ are washers placed between the doubletree and arms.

Fig. 2 shows the arms secured to the under side of the doubletree, their ends extending outwardly as far as the ends of the doubletree and provided with clevises $b\ b$ secured thereto by bolts and nuts $a^3$. Said clevises are provided with hooks or eyes for attaching singletrees and hooks for attaching our spring draft connections. The arms A A swing freely on their bolts, the draft pulling the end of the arms outwardly against the resilience of said spring draft connections hereinafter described.

Figure 3:
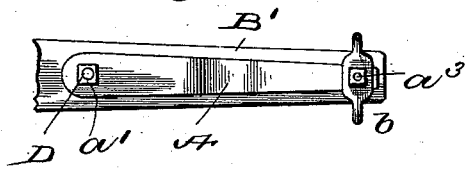
Figure 4:
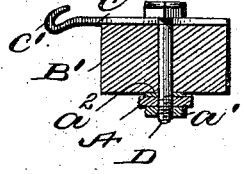

Fig. 3 shows a plan view in detail of one of the swinging arms A with clevis $b$ attached, and Fig. 4 a detail view which gives a cross section taken on the line $g\ g$ of Fig. 1 showing the stay plate $c$, hook $c'$ formed integral therewith, and manner of attaching the same to the doubletrees by the bolt D, A showing a section of the arm, $a^2$ the washer, and $a'$ the nuts. At the ends of the doubletree we provide bolts $ff$ for attaching the clevises $b\ b$ should the arms A A be detached from the doubletree. However the usual clevises may be used on the doubletree and the arms remain in position.

Figure 5:
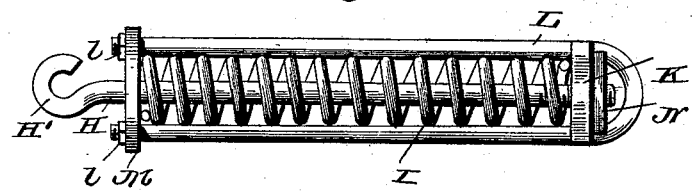

Fig. 2 gives a plan view of our spring draft attachment in position, showing its connection with the arms A A, and Fig. 5 gives a plan in detail of our spring draft attachment in which H denotes the draw bar having a hook H' at one end and screw threaded at the other end to receive a nut K.

L denotes a rod bent in an elongated U shape forming a loop at the bend which serves as a link or eye for connecting the clevis hook. The ends of the rod are screw threaded to receive nuts $l\ l$.

Figure 6:
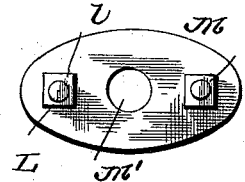

M. denotes a face plate a top plan view of which is shown in Fig. 6, provided with a central perforation $m$ through which passes the draw-bar, and perforations at each side admit the ends of the rod L. Said face plate is held in place by nuts $l\ l$.

Figures 7, 8:

N. denotes a brace, a plan view of which is shown in Fig. 7, and is provided with yokes

*n n* which register with or fit between the inner sides of the rod L and serve to brace them apart. Said brace may also serve to limit the backward thrust of the draw bar and prevent the nut K from jamming at the bend of the rod L. The nut K is shown in plan in Fig. 7 and is provided with a perforation which is screw threaded to receive the draw bar H and is provided with yokes *k k* which register with or fit between the inner sides of the rod L.

The coiled spring I encircles the draw bar and is held at the sides by the rod L, the ends being held between the face plate M and the nut K. As the draw bar is pulled out the spring is compressed by the nut K forcing it forward against said face plate.

Having shown and described our invention, what we claim, and desire to secure by Letters Patent, is—

In a spring draft attachment, the combination with an independent doubletree, of the swinging arms having their outer ends deflected from contact with the doubletree and running parallel and coextensive therewith and their inner ends pivoted to the doubletree on opposite sides of and between the doubletree bolt and the ends of the doubletree.

In testimony whereof we affix our signatures in presence of two witnesses.

WILLIAM ELLIS HARMON.
JOHN L. GARWOOD.

Witnesses:
J. W. WARD,
G. ST. C. HUSSEY.